United States Patent
Fraley et al.

(10) Patent No.: US 8,261,846 B2
(45) Date of Patent: Sep. 11, 2012

(54) IMPLEMENT SUPPORT STAND

(75) Inventors: J. Phillip Fraley, Winfield, AL (US); John W. Davis, III, Winfield, AL (US)

(73) Assignee: King Kutter, Inc., Winfield, AL (US)

( * ) Notice: Subject to any disclaimer, the term of this patent is extended or adjusted under 35 U.S.C. 154(b) by 45 days.

(21) Appl. No.: 12/829,992

(22) Filed: Jul. 2, 2010

(65) Prior Publication Data
US 2011/0001034 A1    Jan. 6, 2011

Related U.S. Application Data

(60) Provisional application No. 61/222,666, filed on Jul. 2, 2009.

(51) Int. Cl.
*A01B 35/00* (2006.01)
(52) U.S. Cl. ...................................... 172/776
(58) Field of Classification Search ............ 172/41, 172/42, 43, 123, 125, 272–275, 776; 37/231–233, 37/266
See application file for complete search history.

(56) References Cited

U.S. PATENT DOCUMENTS

| | | | |
|---|---|---|---|
| 862,945 A | 8/1907 | Tiffany | |
| 3,295,721 A * | 1/1967 | Hibbard et al. | 222/51 |
| 3,788,671 A * | 1/1974 | MacAlpine | 280/303 |
| 4,240,508 A | 12/1980 | Ishiguro et al. | |
| 5,050,322 A * | 9/1991 | Burkard | 37/270 |
| 5,485,690 A * | 1/1996 | MacQueen | 37/271 |
| 5,690,180 A * | 11/1997 | Veronesi | 172/112 |
| D388,440 S * | 12/1997 | Bentley | D15/13 |
| 6,178,669 B1 * | 1/2001 | Quenzi et al. | 37/231 |
| 6,276,707 B1 | 8/2001 | Ungvari | |
| 6,453,582 B1 * | 9/2002 | Fulton, III | 37/197 |
| 6,766,866 B2 * | 7/2004 | Miyahara et al. | 172/41 |
| 2008/0296865 A1 | 12/2008 | Canetti | |

OTHER PUBLICATIONS

International Search Report and Written Opinion issued in corresponding International Application No. PCT/US2010/040945 on Sep. 7, 2010.

* cited by examiner

*Primary Examiner* — Robert Pezzuto
(74) *Attorney, Agent, or Firm* — Angela Holt; Bradley Arant Boult & Cummings LLP

(57) ABSTRACT

A support stand for an implement such as a tiller is provided. During use of the implement when the implement is connected to a tractor, the support stand is in a stowed position adjacent to a side of the implement. When the implement is disconnected from the tractor, the support stand is rotatable outwards from the side of the implement and frontwards toward the front of the implement and rests against the ground to maintain the implement in a generally upright position.

7 Claims, 5 Drawing Sheets

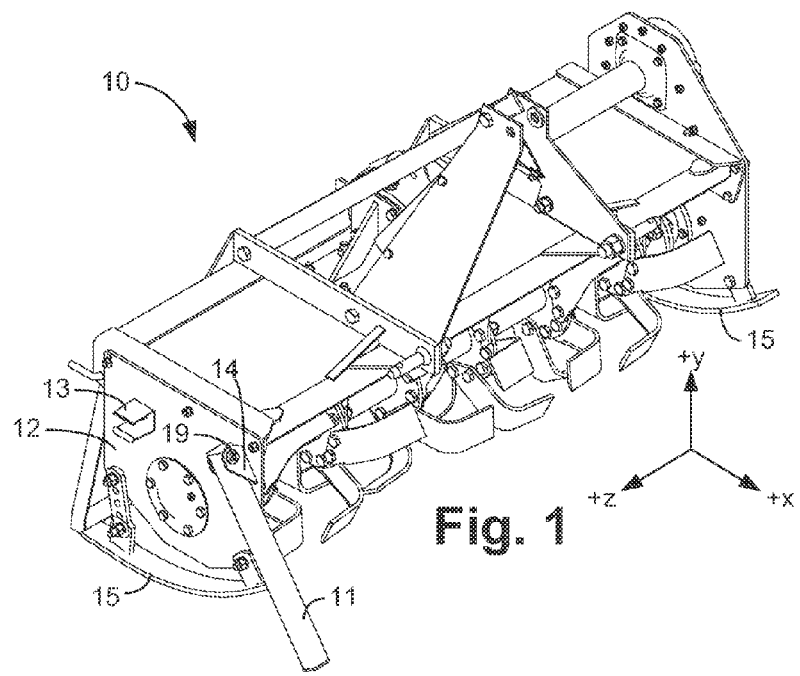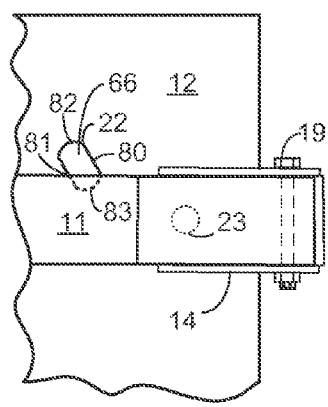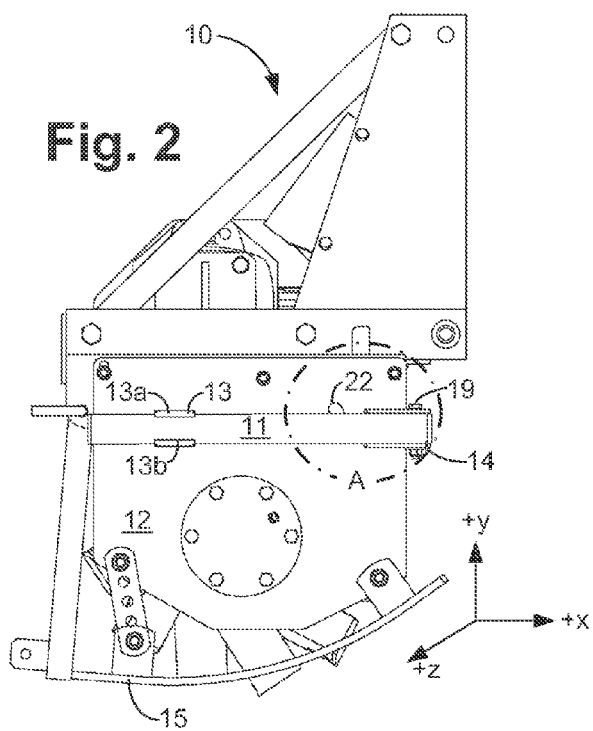

(Detail B)

(Detail C)

IMPLEMENT SUPPORT STAND

CROSS-REFERENCE TO RELATED APPLICATIONS

This application claims the benefit of U.S. Provisional Application No. 61/222,666, filed on Jul. 2, 2009, the entire contents of which are herein incorporated by reference.

FIELD OF THE INVENTION

The present invention relates generally to the field of tractor-based, rotary-driven power equipment, and more particularly relates to a support stand for tillers and other such implements.

BACKGROUND AND SUMMARY OF THE INVENTION

A support stand for a tiller or other such implement is provided. In operation, tillers and other farming implements are pulled behind a tractor. It is desirable to have a kickstand or support stand to support the tiller in an upright position when it is not hitched to the tractor and/or during hitching of the tiller to the tractor.

The tiller comprises a support stand that is stowable when not in use. In this regard, a spring clip retains the support stand against the side of the tiller. A pivot plate rotatably receives the support stand and allows the support stand to pivot out from the tiller during deployment to avoid contact with the tiller components. The pivot plate is rotatably connected to the wall of the tiller. When the support stand is fully deployed, it rests against a stop extending from the wall of the tiller. The stop prevents further rotation of the support stand.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

The disclosure can be better understood with reference to the following drawings. The elements of the drawings are not necessarily to scale, emphasis instead being placed upon clearly illustrating the principles of the disclosure. Furthermore, like reference numerals designate corresponding parts throughout the several views.

FIG. 1 is a front perspective view of an exemplary tiller in accordance with the present disclosure, with the support stand in its fully deployed position.

FIG. 2 is a side plan view of the tiller of FIG. 1, with the support stand in its stowed position.

FIG. 3 is an enlarged detail view of the tiller of FIG. 2, taken along detail line "A" of FIG. 2.

FIG. 11b is a side plan view of the pivot plate of FIG. 11a.

FIG. 11c is an end view of the pivot plate of FIG. 11a.

FIG. 12b is an end view of the spring clip of FIG. 12a.

DETAILED DESCRIPTION

Figure 4:
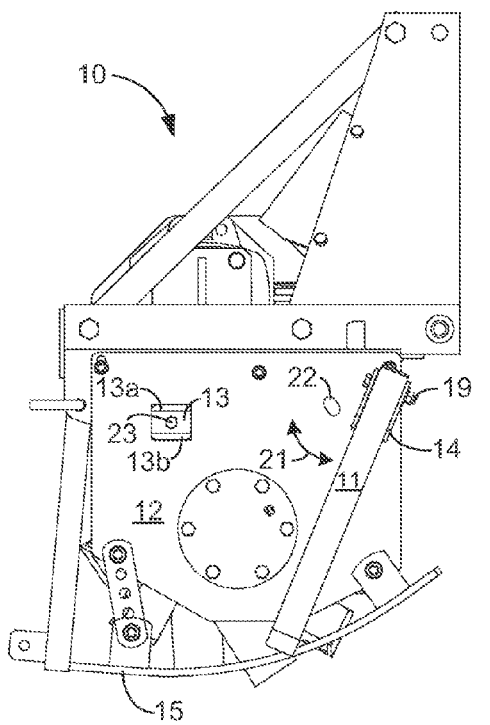
FIG. 4 is a side plan view of the tiller of FIG. 1, with the support stand in a partially deployed position.

FIG. 1 depicts a front perspective view of a tiller 10 according to one embodiment of the present disclosure. The tiller 10 comprises a tiller body 75 and rotating tines 76 for conditioning soil (not shown). A support stand 11 is rotatably connected to a side 12 of the tiller 10 via a pivot plate 14. The support stand 11 contacts the ground (not shown) when the support stand 11 is in a "fully deployed" position, as discussed further herein. The support stand 11 enables the tiller 10 to remain upright even when the tiller 10 is unhitched from a tractor (not shown).

In this regard, the tiller 10 comprises a pair of skids 15 which contact the ground. In normal operation, the tiller 10 is supported by the skids 15 and by the tractor, the tractor's support being provided via a standard three-point hitch (not shown). If the tiller 10 is unhitched from the tractor, the tiller 10 would not remain upright due to the curved nature of the skids 15. The support stand 11 provides support to maintain the tiller 10 in an upright orientation.

In the illustrated embodiment, the support stand 11 comprises a tubular bar with a generally rectangular cross section. The support stand 11 is rotatably connected to the pivot plate 14 via a fastener 19. The support stand 11 rotates around an axis (not shown) running through the fastener 19.

The pivot plate 14 is rotatably connected to the side 12 of the tiller 10 via a pivot plate fastener (not shown). In this regard, the pivot plate 14 rotates in the same plane as the side 12 of the tiller 10. In the illustrated embodiment, this plane is the x-y plane. The support stand 11 is thus effectively rotatable in two different directions with respect to the tiller 10. First, the support stand 11 rotates with respect to the pivot plate 14 as discussed above. Second, the support stand 11 rotates with respect to the tiller 10 via the rotation of the pivot plate 14 in the x-y plane.

FIG. 2 is a side plan view of the tiller 10 of FIG. 1 with the support stand 11 in a stowed position. In this illustration, the support stand 11 is received by a spring clip 13, which retains the support stand 11 against the side 12 of the tiller 10. The spring clip 13 is rigidly connected to the side 12 of the tiller 10, such that when the support stand 11 is retained by the spring clip 13, the support stand 11 is prevented from rotating in any direction.

In this embodiment, the spring clip 13 comprises a one-piece, unitary clip with upper and lower tabs 13a and 13b, respectively, which receive the support stand 11 and releasably restrain it via a friction fit.

To release the support stand 11 from the spring clip 13, a user (not shown) may either push tab 13a upwardly or press tab 13b it downwardly. Then the user may pull the support stand 11 outwardly (i.e., in the +z direction) from the spring clip 13, and the support stand 11 will rotate around the fastener 19. The support stand 11 may then be rotated counter-clockwise to its fully deployed position.

A stop 22 protrudes from the wall 12 and restrains the pivot plate 14 when the support stand 11 is in a fully deployed position. The stop 22 is partially obstructed by the support stand 11 in FIG. 2, but can be more clearly viewed in FIGS. 3 and 4. The stop 22 protrudes from the wall 12 such that it does not obstruct the rotation of the support stand 11, but it will obstruct movement of the pivot plate 14, as further discussed herein.

FIG. 3 is an enlarged detail view of the tiller 10 of FIG. 2, taken along detail line "A" of FIG. 2. The stop 22 is an oblong protrusion that extends outwardly from the wall 12 of the tiller 10. In this embodiment, the stop 22 comprises a forward straight side 80, a rearward straight side 81, a top rounded side 82, and a bottom rounded side 83, and an outermost edge 66.

Figure 8:
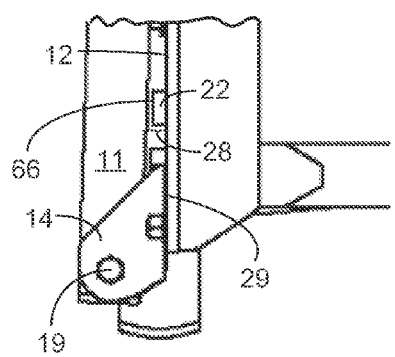
FIG. 8 is an enlarged detail view of the tiller of FIG. 7, taken along detail line "C" of FIG. 7.

The stop 22 extends generally perpendicularly from the wall 12 of the tiller 10, but does not extend so far that it contacts the support stand 11, as further illustrated in FIG. 8 herein. After the support stand 11 is rotated in its fully deployed position, the stop 22 restrains the pivot plate 14 from further rotation, as further illustrated in FIG. 6 herein.

FIG. 4 is a side plan view of the tiller 10 of FIG. 2, with the support stand 11 partially rotated but not fully deployed. In this illustration, the support stand 11 has rotated counter-clockwise from its stowed position (as illustrated in FIG. 2), to a position mid-way to a fully deployed position.

The spring clip 13 is unobstructed in this illustration, and is further described with respect to FIG. 13 herein. The spring clip fastener 23 rigidly connects the spring clip 13 to the wall 12 of the tiller 10.

Figure 5:
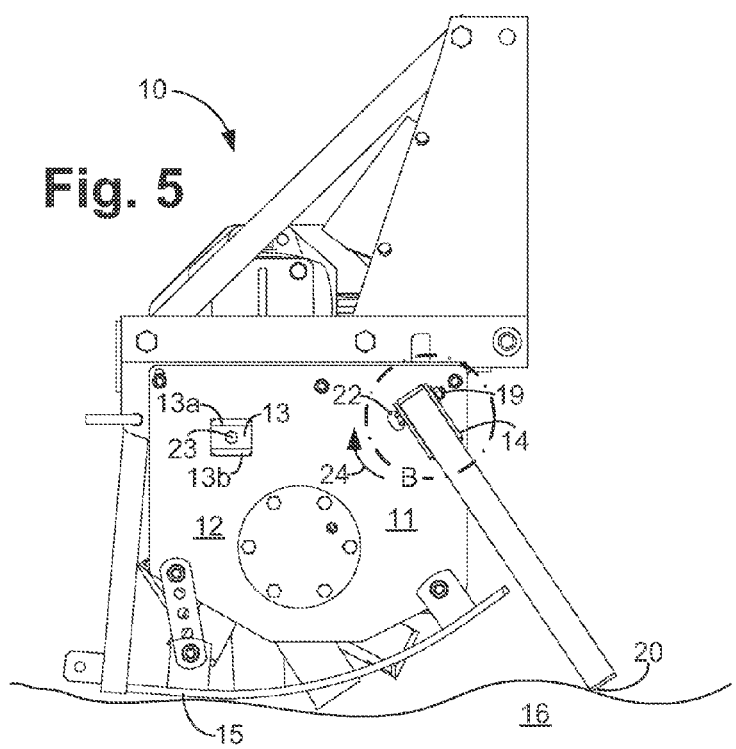
FIG. 5 is a side plan view of the tiller of FIG. 1, with the support stand in a fully deployed position.

FIG. 5 is a side plan view of the tiller 10 of FIG. 2, with the support stand 11 in its fully deployed position. In this configuration, a bottom edge 20 of the support stand 11 rests upon the ground 16 as shown. The tiller is thus supported by both the support stand 11 and the skids 15 (only one of which skids is shown in FIG. 5).

When the support stand 11 is in its fully deployed position, it will not rotate further in the counterclockwise direction, and will only rotate clockwise, as indicated by directional arrow 24. The support stand 11 is stopped from further rotation by the contact between the pivot plate 14 and the stop 22, as discussed further with respect to FIG. 6 below.

Figure 6:
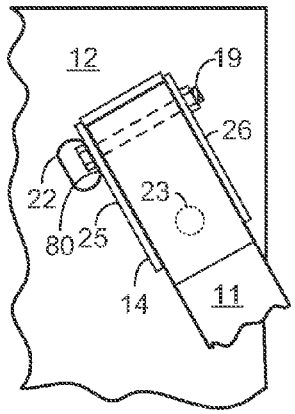
FIG. 6 is an enlarged detail view of the tiller of FIG. 5, taken along detail line "B" of FIG. 5.

FIG. 6 is an enlarged detail view of the tiller 10 of FIG. 5, taken along detail line B of FIG. 5. The pivot plate 14 comprises a first side bracket 25 and a second side bracket 26. The first side bracket 25 and second side bracket 26 extend substantially perpendicularly from the pivot plate 14 and comprise openings (not shown) receive the fastener 19 that rotatably connects the support stand 11 to the pivot plate 14.

When the pivot plate 11 is fully rotated with respect to the side 12 of the tiller 10, the first side bracket 25 contacts the stop 22 and is prevented from further rotation in the counterclockwise direction. In this regard, the stop 22 is angled such that the forward straight side 80 is generally parallel to an outer contacting surface of the first side bracket 25 when the support stand 11 is in its fully deployed position.

Figure 7:
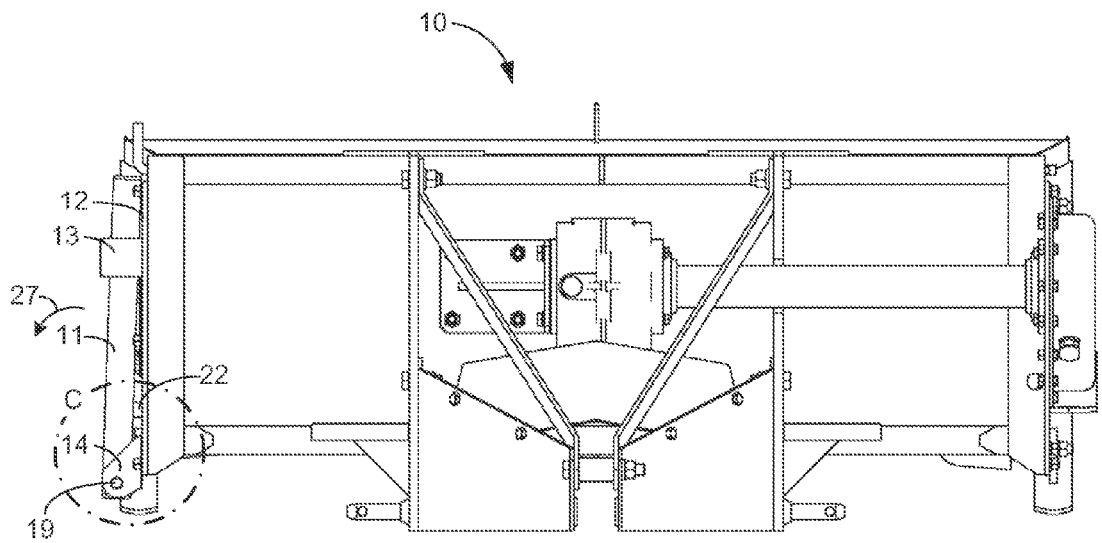
FIG. 7 is a top plan view of the tiller of FIG. 2.

FIG. 7 is a top view of the tiller 10 of FIG. 1, showing the support stand 11 in its stowed position. As was discussed above, the support stand 11 rotates in the direction indicated by directional arrow 27 and pivots around the fastener 19 in the pivot plate 14.

The stop 22 extends from the side 12 of the tiller 10, and is in close proximity to, but does not interfere with the rotation of, the support stand 11, when the support stand 11 is rotating with the pivot plate 14 in the same plane as the side 12 of the tiller 10.

FIG. 8 is a detail view of the tiller 10 of FIG. 7, taken along detail line "C" of FIG. 7. Note that there is a considerable gap 28 between the support stand 11 and the side 12 of the tiller 10, and the stop 22 is disposed within the gap 28. There is not a considerable gap between the bottom edge 29 of the pivot plate 14 and the side 12 of the tiller 10. Therefore, when the pivot plate 14 contacts the stop 22 when the support stand 11 is in its fully deployed position as discussed herein, the stop 22 restrains the pivot plate 14 from further rotation. In other words, the distance between the bottom edge 29 of the pivot plate 14 and the side 12 of the tiller 10 for the pivot plate 14 is less than the distance between an outermost edge 66 of the stop 22 and the side 12. Additionally, the distance between the support stand 11 and the side 12 of the tiller 10 is greater than the distance between the outermost edge 66 of the stop 22 and the side 12.

Figure 9:
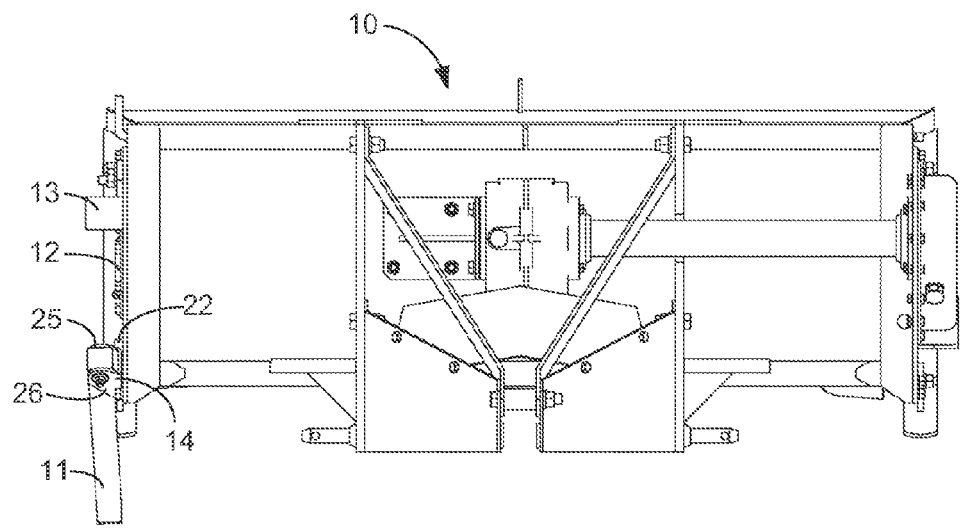
FIG. 9 is a top plan view of the tiller of FIG. 1.

FIG. 9 is a top view of the tiller 10 of FIG. 1, showing the support stand 11 in its fully deployed position. In this position, the stop 22 contacts the first side bracket 25 of the pivot plate 14 and prevents the pivot plate 14 from rotating further.

Figure 10:
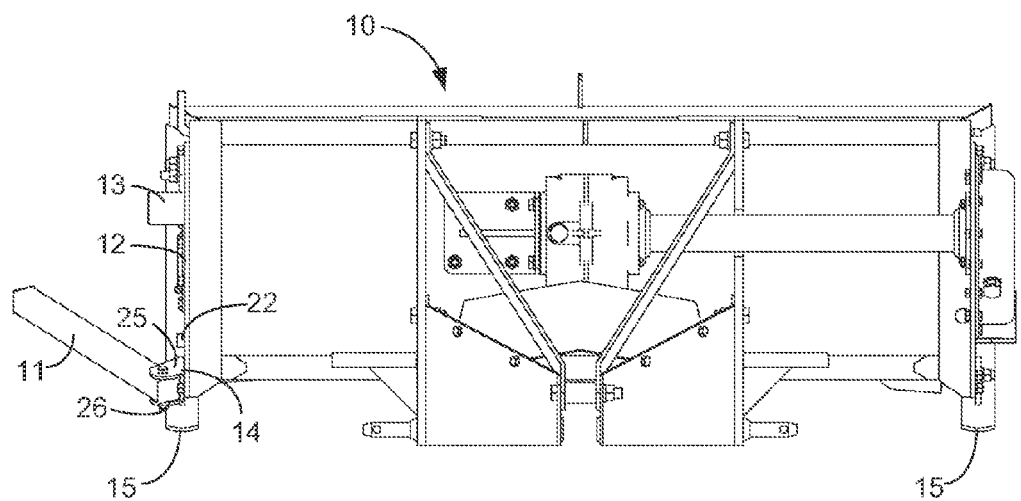
FIG. 10 is a top plan view of the tiller of FIG. 4.

FIG. 10 is a top view of the tiller 10 of FIG. 4, showing the support stand 11 partially rotated but not fully deployed. In this illustration, the support stand 11 has rotated from its stowed position (as illustrated in FIGS. 2 and 7), to a position mid-way to a fully deployed position. In this position, the support stand 11 has been rotated out from the side 12 of the tiller 10 to remove it from the spring clip 13. When the support stand 11 is in its fully deployed position, as shown in FIG. 9, the support stand 11 is rotated back toward the tiller 10 such that the support stand 11 contacts the inner surface (not shown) of the pivot plate 14. The rotation of the support stand 11 outwardly during deployment enables it to clear the skids 15 and any protrusions (not shown) that extend from the side 12 of the tiller 10.

Figure 11A:
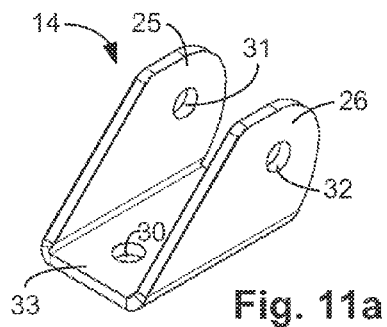
FIG. 11a is a side perspective view of a pivot plate according to an embodiment of the present disclosure.

FIG. 11a is a side perspective view of the pivot plate 11. In this embodiment, the pivot plate 14 is formed from a flat sheet of material, such as steel, and is bent into its final shape. The first side bracket 25 and second side bracket 26 comprise openings 31 and 32 which receive the fastener 19 (FIG. 1) that rotatably connects the support stand 11 (FIG. 1) to the pivot plate 14. The brackets 25 and 26 are bent outwardly generally perpendicularly from a base 33 to form a U-shape when viewed from the end, as shown in FIG. 11c.

An opening 30 in the base 33 receives the pivot plate fastener (not shown) that rotatably connects the pivot plate to the side 12 (FIG. 1) of the tiller 10 (FIG. 1).

Figure 11B:
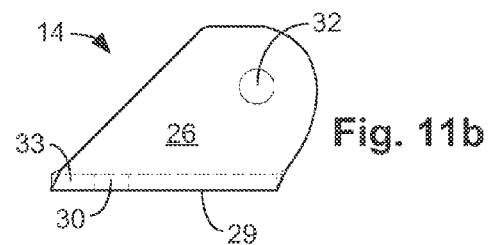
Figure 11C:
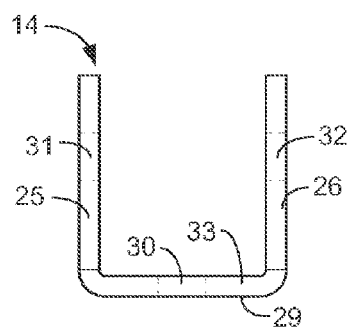

FIG. 11b is a side view of the pivot plate 14. The bottom edge 29 of the pivot plate 14 is generally flat. In this embodiment, the opening 30 in the base 33 is located on an opposite end of the pivot plate 14 from the openings 31 and 32, i.e., the opening 30 is offsent from the openings 31 and 32. These locations ensure that the rotation of the support stand 11 (FIG. 1) with respect to the pivot plate 14 does not interfere and is not interfered with by the rotation of the pivot plate 14 with respect to the side 12 (FIG. 1) of the tiller 10 (FIG. 1).

Figure 12A:
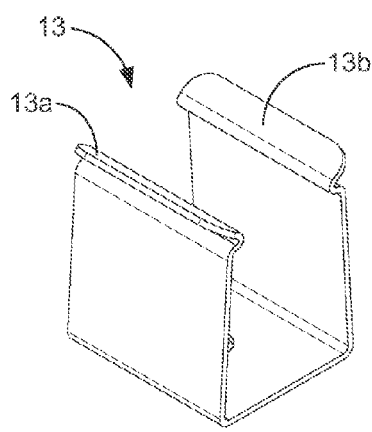
FIG. 12a is a side perspective view of a spring clip according to an embodiment of the present disclosure.

FIG. 12a is a side perspective view of the spring clip 13 that retains the support stand 11 when it is in its stowed position. Upper and lower tabs 13a and 13b, respectively, receive the support stand 11 (FIG. 2) and releasably restrain it via a friction fit.

Figure 12B:
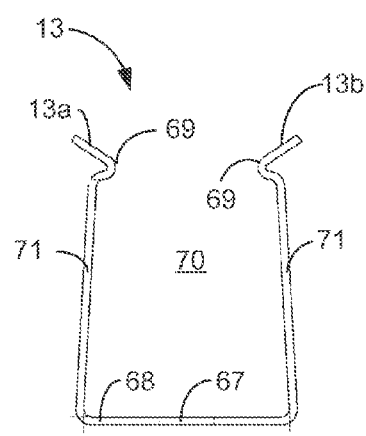

FIG. 12b is an end view of the spring clip 13 of FIG. 12a. The spring clip 13 retains the support stand 11 (FIG. 2) within an opening 70 formed by a base 68 and two sidewalls 71. The upper and lower tabs 13a and 13b are outwardly-angled angled for ease in receiving the support stand 11. Protrusions 69 that retain the support stand 11 (FIG. 2) when it is in its stowed position. An opening 67 in a base 68 of the spring clip 13 receives a fastener (not shown) that attaches the spring clip 13 to the side 12 (FIG. 2) of the tiller 10 (FIG. 2).

Although the present disclosure primarily discusses the support stand 11 in use with a tiller 10, the support stand 11 may be used on many different types of implements, for example, farm implements to be pulled behind a tractor. The term "tiller" as used herein may thus refer to any type of implement on which a support stand may be desired, and is not limited to an actual tiller.

What is claimed is:

1. A device comprising:
    a pivot plate rotatably affixed to a side of an implement, the pivot plate comprising a substantially flat bottom and a pivot plate opening extending through the substantially flat bottom at a first end of the pivot plate for receiving a fastener that rotatably affixes the pivot plate to the side of the implement, wherein the pivot plate rotates around the fastener in a first plane that is substantially parallel to the side of the implement, the pivot plate further comprising a first side bracket and a second side bracket, each side bracket extending substantially perpendicular to and coextensive with the flat bottom, each side bracket comprising a bracket opening, wherein the bracket openings of the first side bracket and second side bracket are disposed at an opposite end of the pivot plate from the pivot plate opening;
    a support stand rotatably affixed to the pivot plate via a support stand fastener extending through the openings in the first side bracket and the second side bracket, wherein the support stand rotates around the support stand fastener with respect to the pivot plate in a second plane that is substantially perpendicular to the first plane;
    a stop protruding from the side of the implement, wherein the stop contacts the first side bracket of the pivot plate and prevents the pivot plate from further rotation when the support stand is in a deployed position.

2. The device of claim 1, wherein when the support stand is in the stowed position, the support stand is adjacent to the side of the implement and is retained by a spring clip.

3. The device of claim 2, wherein the spring clip is affixed to the side of the implement and releasably retains the support stand when the support stand is in its stowed position.

4. The device of claim 2, wherein the spring clip comprises two outwardly-angled tabs each of which tabs is coextensive with an inwardly-facing protrusion, wherein the inwardly-facing protrusions frictionally retain the support stand when the support stand is in its stowed position.

5. The device of claim 1, wherein the implement is a tiller.

6. The device of claim 1, wherein the stop comprises a forward straight side that is substantially parallel to the first side bracket of the pivot plate when the pivot plate is fully rotated such that the support stand is in a deployable position.

7. The device of claim 1, wherein when the support stand is in the deployed position, the support stand is contactable with a surface upon which the implement rests and maintains the implement in a substantially upright position.

* * * * *